(12) United States Patent
Ohsaki et al.

(10) Patent No.: US 7,125,085 B2
(45) Date of Patent: Oct. 24, 2006

(54) BRAKING FORCE RETAINING UNIT

(75) Inventors: Seiji Ohsaki, Saitama (JP); Hiroyasu Ishizuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/232,027

(22) Filed: Sep. 21, 2005

(65) Prior Publication Data

US 2006/0108868 A1   May 25, 2006

(30) Foreign Application Priority Data

Sep. 21, 2004   (JP) .............................. 2004-273152

(51) Int. Cl.
*B60T 8/36* (2006.01)
(52) U.S. Cl. .................... 303/119.1; 188/353
(58) Field of Classification Search ................ 188/353; 303/119.1, 191, 192
See application file for complete search history.

(56) References Cited

U.S. PATENT DOCUMENTS

| 4,852,950 | A | * | 8/1989 | Murakami | .................. 303/192 |
| 5,984,429 | A | * | 11/1999 | Nell et al. | ............... 303/113.4 |
| 6,120,110 | A | * | 9/2000 | Shimizu | .................. 303/113.4 |
| 6,227,629 | B1 | * | 5/2001 | Yoshida et al. | ............. 303/155 |
| 6,332,654 | B1 | * | 12/2001 | Yano | ........................... 303/89 |
| 6,364,436 | B1 | * | 4/2002 | Sawada | ...................... 303/191 |
| 6,415,897 | B1 | * | 7/2002 | Sugimoto et al. | ........... 188/353 |
| 6,547,344 | B1 | * | 4/2003 | Hada et al. | ................. 303/191 |

FOREIGN PATENT DOCUMENTS

JP   2001-354126   12/2001

* cited by examiner

*Primary Examiner*—Christopher P. Schwartz
(74) *Attorney, Agent, or Firm*—Carrier, Blackman & Associates, P.C.; Joseph P. Carrier; William D. Blackman

(57) ABSTRACT

A braking force retaining unit has a cut-off valve and a control unit. The cut-off valve retains predetermined brake hydraulic pressure at the wheel cylinders until a predetermined releasing condition is established, even after the depression of a brake pedal is released when a vehicle is stopped. When the predetermined releasing condition is established, the retained brake hydraulic pressure is released, when the depression of the brake pedal is released, the control unit controls the cut-off valve so as to retain the brake hydraulic pressure while reducing the retained brake hydraulic pressure at a first reduction rate. When the predetermined releasing condition is established, the control unit controls the cut-off valve so as to allow the retained brake hydraulic pressure to be reduced at a second reduction rate which is faster than the first reduction rate.

6 Claims, 8 Drawing Sheets

[ BRAKE HYDRAULIC PRESSURE RETENTION ]

BRAKING FORCE RETAINING UNIT

CROSS REFERENCE TO RELATED APPLICATIONS

The present invention claims foreign priority under 35 USC 119 based on Japanese patent application no. P.2004-273152, filed on Sep. 21, 2004, the contents of which are incorporated herein by reference.

BACKGROUND OF THE INVENTION

1. Field of the Invention

The present invention relates to a braking force retaining unit which can retain a braking force even after the depression of a brake pedal has been released.

2. Description of the Background Art

A braking force retaining unit is configured to include an electromagnetic or solenoid valve which operates electromagnetically at an intermediate position along the length of a brake hydraulic circuit so as to cut off the brake hydraulic circuit by supplying the solenoid valve with an electric current, whereby even after the driver releases the depressed brake pedal, brake hydraulic pressure (braking force) is retained at the wheel cylinders. As a result, the vehicle is, for example, prevented from moving backward from its own weight when attempting to start climbing up a rising slope. Then, in the event that the retained brake hydraulic pressure is made zero or made to collapse totally at one time, occupants of a vehicle have to be made to feel a feeling of some abruptness or physical disorder, which is not preferable from the viewpoint of product quality. Due to this, in JP-A-2001-354126 (FIGS. 4, 8, 12 and the like), when releasing a retained brake hydraulic pressure, a time difference is provided in release initiating timing between two crossed brake hydraulic pressure circuits (crossed brake pipe lines).

However, in order to enable a smoother start, the feeling of abruptness and physical disorder that the occupants of the vehicle are forced to feel needs to be reduced further. In addition, in the case of JP-A-2001-354126, in the event that a large time difference is set in release initiating timing between two crossed brake hydraulic pressure circuits, since a behavior such as one in which a body of the vehicle is twisted in some way is generated in the crossed brake pipe lines, there is imposed a limitation on setting of time. Hence the compatibility of the reduction in a shock felt by the occupants when the applied brakes are released with the reduction in the behavior in which the body of the vehicle is twisted needs a certain compromise.

SUMMARY OF THE INVENTION

A main goal of the invention is to provide a braking force retaining unit which can realize a smoother start of a vehicle while producing no such twist of the body and to reduce the feeling of abruptness and physical disorder that are given to occupants of the vehicle.

With a view to achieving this goal, according to a first aspect of the invention, there is provided a braking force retaining unit, comprising:

a cut-off valve disposed between a master cylinder and wheel cylinders in a brake hydraulic circuit; and a control unit for controlling opening and closing of the cut-off valve, wherein the cut-off valve retains a predetermined brake hydraulic pressure at the wheel cylinders until a predetermined releasing condition is established, even after the depression of a brake pedal is released when a vehicle is stopped. When the depression of the brake pedal is released, the control unit controls the cut-off valve so as to continue to retain the retained brake hydraulic pressure at the wheel cylinders while gradually reducing the retained brake hydraulic pressure at a first reduction rate The control unit controls the cut-off valve so as to gradually reduce the retained brake hydraulic pressure at the wheel cylinders at a second reduction rate which is faster than the first reduction rate to thereby release the retained brake hydraulic pressure.

According to the configuration described above, the brake hydraulic pressure is retained while being gradually reduced at the first reduction rate after the release of the depression of the brake pedal. Then, when the predetermined releasing condition is established, the retained brake hydraulic pressure is gradually released at the second reduction rate. The second reduction rate, used when implementing the release of the retention, is faster than a rate at which the retained brake hydraulic pressure is reduced at the first reduction rate. Due to this, it becomes possible to release the braking force quickly while maintaining a smooth vehicle start. In addition, since there are a plurality of brake pipe lines, and no time difference is provided in releasing timing between the respective brake pipe lines, the twist of the body is not generated at the time of releasing the braking force.

According to a second aspect of the invention, in addition to the invention set forth in the first aspect thereof, there is provided the braking force retaining unit, wherein the cut-off valve generates a cut-off force according to a current value of a supplied breaking current in such a manner that a large cut-off force is generated when the current value is large, and a small cut-off force is generated when the current value is small, so as to retain the brake hydraulic pressure according to the generated cut-off force.

The control unit controls the current value of the breaking current, which is supplied to the cut-off valve, to thereby control the cut-off valve at the first reduction rate and the second reduction rate. The second reduction rate is a rate which is in proportion to a vehicle drive force that is detected by a drive force detecting device which detects the vehicle drive force.

In the configuration described above, when the current value of the breaking current supplied to the cut-off valve is reduced at a rate corresponding to the first reduction rate, the retained brake hydraulic pressure is reduced at the first reduction rate. In addition, when the current value of the breaking current supplied to the cut-off valve is reduced at a rate corresponding to the second reduction rate, the retained brake hydraulic pressure is reduced at the second reduction rate which is in proportion to the vehicle drive force, and the brake hydraulic pressure is released in such a manner as to be replaced by the vehicle drive force.

Note that for example, a proportional solenoid valve, which will be described later on, can be employed as the cut-off valve.

According to a third aspect of the invention, in addition to the invention set forth in the first aspect thereof, there is provided the braking force retaining unit, wherein the retained brake hydraulic pressure is gradually reduced at the second reduction rate, when the predetermined condition is established when at least one of the following conditions occurs:

(1) a time period has elapsed which is set by a first timer, the first timer adapted to be activated when a brake switch is switched OFF;

(2) the rotational speed of an engine of the vehicle exceeds a predetermined threshold; and (3) a time period has elapsed which is set by a second timer, the second timer adapted to be activated when a brake hydraulic pressure at the master cylinder becomes equal to or lower than a predetermined value as a result of release of the depression of the brake pedal by the driver.

According to the first aspect of the invention, a smoother start of the vehicle can be enabled while producing no twist of the body when releasing the applied brakes and further reducing the feeling of physical disorder and abruptness.

In addition, according to the second aspect of the invention, the control of the cut-off valve is ensured by controlling the current value that is supplied to the cut-off valve.

In addition, according to the third aspect of the invention, the point in time when the release of brake hydraulic pressure is initiated is clarified, thereby making it possible to implement an appropriate release of brake hydraulic pressure.

DETAILED DESCRIPTION OF THE PREFERRED EMBODIMENTS

Hereinafter, a best mode (hereinafter, referred to as an embodiment) for providing a braking force retaining unit of the invention will be described in detail by reference to the drawings.

A braking force retaining unit of the invention is applied to a brake unit of a four-wheeled vehicle having an engine. The braking force retaining unit continues to retain a brake hydraulic pressure at respective wheel cylinders until a predetermined releasing condition is established, even after the depression of a brake pedal is released. A brake hydraulic circuit of the brake unit is divided into two systems or lines, and the braking force retaining unit is provided for each of the divided systems. Note that the vehicle has a drive force control unit which changes over a creeping drive force according to depressing conditions of the brake pedal between a large state and a small state when the prime mover is idling and the vehicle is moving at a predetermined vehicle speed or smaller. When used herein, creeping means that a vehicle with an automatic transmission moves slowly as if it were crawling even when the acceleration pedal is not depressed (for example, in such a state that the engine is idling) when the transmission is engaged such as when a D (drive) gear range or an R (reverse) gear range is selected.

<<System Configuration of Vehicle>>

Figure 1:
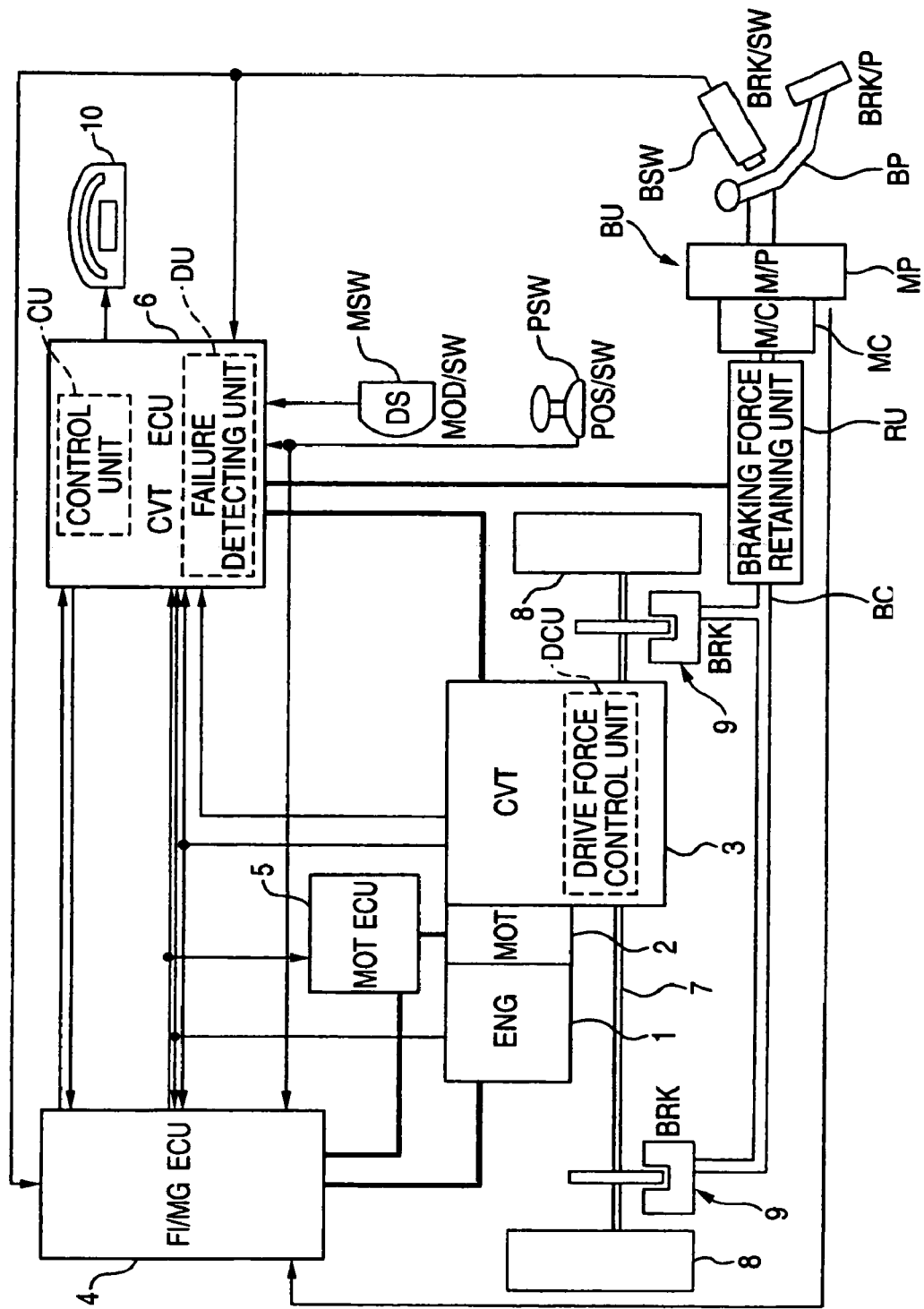
FIG. 1 is a schematic drawing of a vehicle brake system which includes an embodiment of the inventive braking force retaining unit.
Figure 2:
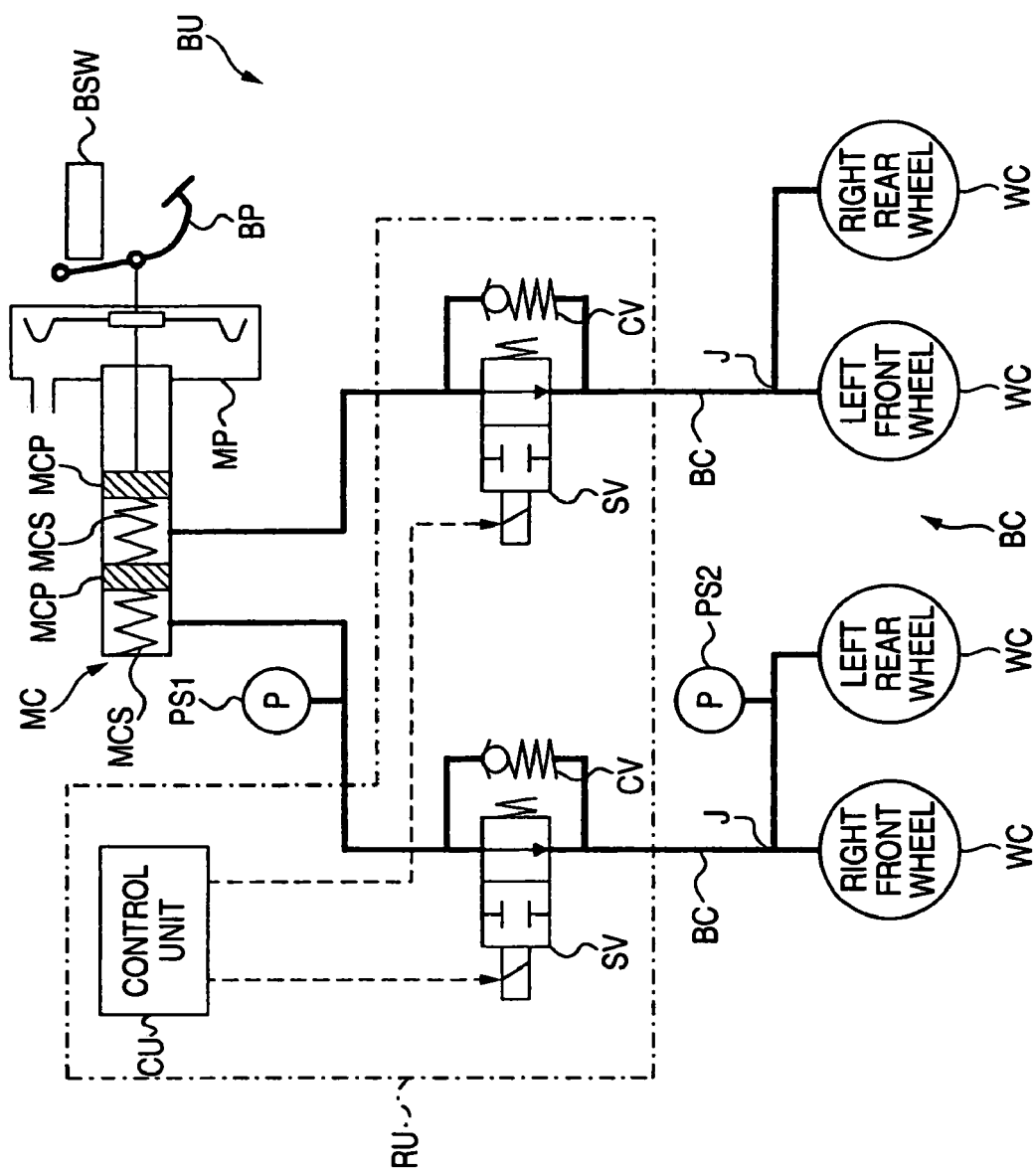
FIG. 2 is a schematic drawing of the brake unit of FIG. 1 showing the configuration hydraulic brake circuit and control unit.

Firstly, the system configuration of a vehicle will be described by reference to FIGS. 1 and 2. FIG. 1 is a drawing which shows the system configuration of a vehicle in which a vehicle brake unit is installed to which a braking force retaining unit of the embodiment is applied. FIG. 2 is a drawing which shows the configuration of the vehicle brake unit in FIG. 1.

The vehicle which will be described in this embodiment is a hybrid vehicle having as prime movers an internal combustion engine 1, which uses gasoline as a drive source, and a motor 2, which uses electricity as a drive source. The hybrid vehicle incorporates therein a belt-type continuously variable transmission (hereinafter, referred to as CVT) 3 as a transmission. Note that the prime movers of the vehicle are not limited to those that have been described above, but alternatively only the engine 1 or only the motor 2 may be used as the prime mover of the vehicle. In addition, the transmission of the vehicle is not limited to the CVT, but alternatively an automatic transmission having a torque converter and a manual transmission may be used.

[Engine (Prime Mover), CVT (Transmission), Motor (Prime Mover)]

The engine 1 is controlled by a fuel injection electronic control unit (hereinafter, referred to as FIECU). Note that FIECU is configured so as to be integrated with a management electronic control unit (hereinafter, referred to as MGECU) and is included in a fuel injection/management electronic control unit (hereinafter, referred to as FI/MGECU) 4. In addition, the motor 2 is controlled by a motor electronic control unit (hereinafter, referred to as MOTECU) 5. Furthermore, the CVT 3 is controlled by a CVT electronic control unit (hereinafter, referred to as CVTECU) 6.

In addition, the CVT 3 is mounted on a drive shaft 7 on which two drive wheels 8, 8 are mounted. A disc brake 9, including a wheel cylinder WC (refer to FIG. 2), is equipped on the drive wheel 8. A master cylinder MC is connected to the wheel cylinders WC of the disc brakes 9 via a braking force retaining unit RU. A depression of a brake pedal BP is transmitted to the master cylinder MC via a master power MP. Whether or not the brake pedal BP is depressed is detected by a brake switch BSW.

The engine 1 is an internal combustion engine which makes use of thermal energy and drives the two drive wheels 8, 8 via the CVT 3 and the drive shaft 7. Note that there sometimes occurs a case where the engine 1 is automatically stopped when the vehicle is stopped in order to—improve fuel economy. Due to this, the vehicle includes an engine stopping unit for stopping the engine 1 when an engine automatic stopping condition is met.

The motor 2 has an assist mode in which the motor assists the engine 1 in driving the drive wheels by making use of electric energy from a battery, not shown. In addition, the motor 2 has a regeneration mode in which, when no assist is required (when the vehicle is running down a falling slope or being decelerated), the motor 2 converts dynamic energy generated by virtue of rotation of the drive shaft 7 into electric energy for storage at the battery, as well as a starting mode in which the engine 1 is started by the motor 2.

The CVT 3 is such that an endless belt is wound around a drive pulley and a driven pulley and the wrap contact diameters of the endless belt with the respective pulleys are altered so as to produce a stepless change in speed ratios. Then, the CVT 3 connects a starter clutch to an output shaft for engagement and transmits an output of the engine 1 or the like which is changed in speed by the endless belt to the drive shaft 7 via a gear on an output side of the starter clutch. Note that the vehicle equipped with this CVT 3 can creep at the time of idling and is equipped with a drive force control unit DCU for reducing the drive force which enables the creeping.

[Drive Force Control Unit]

The drive force control unit DCU is fitted on the CVT 3 and changes the magnitude of the creeping drive force by variably controlling the drive force transmitting capacity of the starter clutch. Note that the drive force control unit DCU incorporates in its configuration the CVTECU 6, which will be described later.

The drive force control unit DCU determines at the CVTECU 6 on a condition for realizing a weak creeping state, a condition for realizing an intermediate creeping state, a condition for realizing a strong creeping state and a condition for realizing a strong creeping state while running, which will be all described later. The drive force control unit DCU alters the drive force transmitting capacity of the starter clutch so as to change the drive force to a drive force that is preset for the determined creeping state. Furthermore, the drive force control unit DCU determines the respective conditions for changing over the creeping drive forces at the CVTECU 6, and sends an oil pressure command value for a linear solenoid valve for controlling the engagement oil pressure of the starter clutch from the CVTECU 6 to the CVT 3. Then, the drive force control unit DCU changes the engagement force of the starter clutch at the CVT 3 based on the oil pressure command value. This also changes the drive force transmitting capacity, whereby the creeping drive forces are changed. Note that the vehicle realizes an improvement in its fuel economy by virtue of the reduction in drive force by the drive force control unit DCU. The improvement of fuel economy is realized by virtue of the reduction in the load of the engine 1, and by virtue of the reduction in the load of a hydraulic pump in the starter clutch. When used herein, the drive force transmitting capacity means a maximum drive force (drive torque) that can be transmitted by the starter clutch. Namely, when a drive force generated in the engine 1 exceeds the drive force transmitting capacity, the starter clutch cannot transmit the drive force which exceeds the drive force transmitting capacity to the drive wheels 8, 8.

When the transmission is engaged such as when a D (drive) gear range or an R (reverse) gear range is selected even when the depression of an acceleration pedal is released at a predetermined vehicle speed or slower, the drive force control unit DCU transmits a drive force from the prime mover to the drive wheels 8, and changes states of the drive force to be transmitted to the drive wheels 8 depending upon conditions of a brake pedal BP, that is, whether or not the brake pedal BP is depressed. This occurs in such a manner that the drive force is put in a small state when the brake pedal BP is depressed, whereas the drive force is put in a large state when the brake pedal is not depressed.

The reason why the drive force is put in the small state when the brake pedal BP is depressed is because the driver should be urged to depress the brake pedal BP hard so as to prevent the vehicle from moving backward from its own weight due to the collapse of the drive force from the engine 1 when the driver attempts to stop the vehicle on a rising slope. On the other hand, the reason why the drive force is put in the large state when the depression of the brake pedal BP is released is because the vehicle should be ready for start from rest or acceleration, and the vehicle can be made to resist the aforesaid backward movement on the rising slope without depending upon braking force.

Note that the creeping drive force of the vehicle in this embodiment has three magnitudes such as (1) the large state, (2) the small state, and, in addition, (3) a state which is an intermediate between the large state and the small state. Drive force transmitting capacities for the respective states are preset such that a large drive force transmitting capacity is for the large drive force state, a small drive force transmitting capacity is for the small drive force state and an intermediate drive force transmitting capacity is for the intermediate drive force state.

In this embodiment, the large drive force (creeping drive force) state is referred to as a strong creeping state, the small drive force state is referred to as a weak creeping state and the intermediate drive force state between the large drive force state and the small drive force state is referred to as an intermediate creeping state. Furthermore, in the strong creeping state, there is a level at which the drive force is large and a level at which the drive force is small, and the large drive force level is simply referred to as a strong creeping state and the small drive force level is referred to as a strong creeping state while running. The strong creeping state is a state in which a drive force is provided which is balanced with an inclination of 5°. The strong creeping state while running provides a drive force which is smaller than the drive force provided in the strong creeping state and constitutes a state at a stage prior to one where the drive force is changed to the weak creeping state. The weak creeping state is a state in which there exists almost no drive force. The intermediate creeping state is a state in which there is provided an intermediate drive force that falls substantially between the strong creeping state and the weak creeping state, and constitutes an intermediate state resulting when the drive force is reduced in a stepped fashion in a process in which the creeping state is changed from the strong creeping state to the weak creeping state. The strong creeping state is realized when the depression of the acceleration pedal is released at the predetermined vehicle speed or slower (namely, when the idling state is taking place) and a position switch PSW is in a state such that the transmission is engaged such as when a D (drive) gear range or an R (reverse) gear range, and then the vehicle moves slowly as if it were crawling upon releasing the depression of the brake pedal BP. The weak creeping state is realized when the brake pedal BP is depressed further, in which the vehicle stops or moves at extremely low vehicle speeds.

[Position Switch]

The position switch PSW permits selection of the desired gear configuration within the transmission, by means of a shift lever. The choices of gear configurations which may be selected via the position switch PSW include a P range which is used when parking the vehicle, an N range which is a neutral position, an R ranged which is used when reversing the vehicle, a D range which is used when running the vehicle normally and an L range which is used when drastically accelerating the vehicle or needing strong engine brake. In addition, running ranges are gear positions in which the vehicle can travel and include, in the case of this vehicle, three ranges such as the D range, the L range and the R range. Furthermore, when the position switch PSW selects the D range, a D mode, which is a normal traveling mode, and an S mode, which is a sports traveling mode, can be selected by a mode switch MSW. Incidentally, information output from the position switch PSW and the mode switch MSW is sent to the CVTECU 6 and further to an instrument cluster 10. The instrument cluster 10 displays gear position information and mode information which are selected by the position switch PSW and the mode switch MSW, respectively.

Note that in this embodiment, the aforesaid reduction of creeping drive force (namely, putting the drive force in the intermediate creeping state and the weak creeping state) is carried out when the position switch PSW is in the D range or the L range, but is not carried out when the position switch PSW is in the R range, and the strong creeping state is retained. In addition, while no drive force is transmitted to the drive wheels 8, 8 in the N and P ranges, the drive force transmitting capacity is reduced and the drive force is formally changed to the weak creeping state.

[ECU's]

The FIECU, which is incorporated in the FI/MGECU 4, controls the injection amount of fuel so as to realize an optimal air-fuel ratio and generally controls the engine 1. Information indicating a throttle opening and the state of the engine 1 is sent to the FIECU, which controls the engine 1 based on the respective pieces of information. In addition, the MGECU incorporated in the FI/MGECU 4 controls mainly the MOTECU 5 and determines an engine automatic stopping condition and an engine automatic starting condition. Information indicating the state of the motor 2 is sent to the MGECU and information indicating the state of the engine 1 is inputted from the FIECU into the MGECU, whereby an instruction on the changeover of the modes of the motor 2 or the like is given to the MOTECU 5 based on the respective pieces of information. In addition, information indicating the state of the CVT 3, information indicating the state of the engine 1, gear position information from the position switch PSW and information indicating the state of the motor 2 are sent to the MGECU, whereby the MGECU determines automatic stopping of the engine 1 or automatic starting of the engine 1 based on the respective pieces of information.

The MOTECU 5 controls the motor 2 based on control signals from the FI/MGECU 4. The control signals from the FI/MGECU 4 include mode information which instructs the motor 2 to start the engine 1, to assist in driving the engine 1 or to regenerate electric energy and output requesting values relative to the motor, and the MOTECU 5 sends out a command to the motor based on the information. In addition, the MOTECU 5 obtains information from the motor 2 or the like and transmits information on the motor 2 such as an amount of power generation and the capacity of the battery to the FI/MGECU 4.

The CVTECU 6 controls the speed ratio of the CVT 3 and the drive force transmitting capacity of the starter clutch. Information indicating the state of the CVT 3, information indicating the state of the engine 1 and range information of the position switch PSW are sent to the CVTECU 6, and the CVTECU 6 transmits signals to control the oil pressure of respective cylinders of the drive pulley and the driven pulley of the CVT 3 and the oil pressure of the starter clutch to the CVT 3.

Furthermore, the CVTECU 6 includes a control unit CU (details of which will be described later) which controls proportional solenoid valves SV (refer to FIG. 2) of the braking force retaining unit RU. In addition, the CVTECU 6 determines the changeover of the creeping drive force and transmits information on the determination so made to the drive force control unit DCU of the CVT 3.

[Prime Mover Stopping Unit]

A prime mover stopping unit provided on the vehicle is made up of the FI/MGECU 4 and the like. The prime mover stopping unit can automatically stop the engine 1 when the vehicle is at a halt. The prime mover stopping unit determines an engine automatic stopping condition at the FI/MGECU 4 and the CVTECU 6. Note that the engine automatic stopping condition will be described in detail later on. Then, when it is determined that the engine automatic stopping condition is met, an engine stopping command is sent to the engine 1 from the FI/MGECU 4 so that the engine 1 is automatically stopped. The vehicle realizes a further improvement in fuel economy by virtue of the automatic stopping of the engine by the prime mover stopping unit.

Note that when the engine 1 is automatically stopped by the prime mover stopping unit, the automatic starting condition of the engine 1 is determined at the FI/MGECU 4 and the CVTECU 6. Then, when the engine automatic starting condition is met, a command to start the engine 1 is sent to the MOTECU 5 from the FI/MGECU 4, and furthermore, a command to start the engine 1 is sent to the motor 2 from the MOTECU 5, so that the engine 1 is automatically started by the motor 2 and the strong creeping state is produced. Note that the automatic starting condition of the engine 1 will be described in detail later on.

[Brakes (Vehicle Brake Unit)]

A brake unit BU is configured so as to include the master cylinder MC, brake hydraulic circuits BC, the wheel cylinders WC, the braking force retaining unit RU (the proportional solenoid valves SV) and the like, and applies braking force to the vehicle based on the will of the driver so as to retard the motion of, or stop, the vehicle. In addition, as has been described above, the vehicle brake unit BU retains brake hydraulic pressure at the wheel cylinders WC until the predetermined releasing condition is established, even after the depression of the brake pedal BP is released when the vehicle is started from rest, thereby facilitating the start from rest on a rising slope.

A piston MCP is inserted in a main body of the master cylinder MC, and the piston MCP is pushed when the driver depresses the brake pedal BP, whereby a brake fluid within the master cylinder MC is pressurized so that a mechanical force is converted into a brake hydraulic pressure (a pressure applied to the brake fluid). When the driver releases the brake pedal BP, the piston MPC is returned to its original position by virtue of a force of a return spring MCS, and at the same time, the brake hydraulic pressure is returned to its original state. The master cylinder MC shown in FIG. 2 is a tandem master cylinder in which two pistons MCP are arranged in a straight line so as to divide the main body of the master cylinder into two to provide two independent brake hydraulic circuits BC to ensure a fail-safe brake system.

In order to reduce the required effort of the driver in applying force to the brake pedal BP, a master power MP (a brake booster) is provided between the brake pedal BP and the master cylinder MC. The master cylinder MC shown in FIG. 2 is of a vacuum (negative pressure) servo type in which vacuum is taken out of an intake manifold of the engine 1 so as to facilitate the operation of the brake pedal BP by the driver.

The brake hydraulic circuit BC connects the master cylinder MC to the wheel cylinders WC and serves as a flow path of brake fluid which transfers brake hydraulic pressure generated in the master cylinder MC to the wheel cylinders by moving the brake fluid. In addition, in the event that the brake hydraulic pressure at the wheel cylinders is higher than that at the master cylinder MC, the brake hydraulic circuit serves as a flow path of brake fluid which returns the brake fluid to the master cylinder MC.

Note that as shown in FIG. 2, the brake hydraulic circuit BC is divided into two independent systems or lines. In this embodiment, the brake hydraulic circuit BC utilizes a crossed brake pipe line system, or a diagonally front to rear brakes split, in which one of the two brake hydraulic circuits BC applies brakes to the right front wheels and the left rear wheels, whereas the other brake hydraulic circuit BC applies brakes to the left front wheel and the right rear wheel. Due to this, both brake hydraulic circuits BC are forked into two branches at branch points J, which are situated at intermediate positions along the length of the circuits, so that the respective brake hydraulic circuits connect to the two wheel cylinders WC, WC. Incidentally, the brake hydraulic circuit BC does not always have to adopt the crossed brake pipe line system, but may adopt a front to rear brake line split in which one of the two divided brake hydraulic circuits applies brakes to both the front wheels, whereas the other brake hydraulic circuit applies brakes to both the rear wheels.

Four wheel cylinders WC are provided, one for each wheel. The wheel cylinders WC serve to convert brake hydraulic pressure that is generated in the master cylinder MC and is then transferred to the wheel cylinders WC through the brake hydraulic circuits BC into a mechanical force (braking force) used to apply brakes to the respective wheels. Note that a piston is inserted into a main body of the wheel cylinder WC, and this piston is pushed by virtue of the brake hydraulic pressure, so that, brake pads, in the case of a disc brake, and brake shoes, in the case of a drum brake, are activated so as to generate braking force which retards the the motion of the respective wheels.

As shown in FIG. 2, the braking force retaining unit RU includes proportional solenoid valves SV and check valves, and is incorporated in brake hydraulic circuits BC which connect the master cylinder MC to the wheel cylinders WC. Note that the braking force retaining unit RU includes a control unit CU in its configuration.

The proportional solenoid valve SV is provided along the brake hydraulic circuit BC which connects the master cylinder MC of the vehicle brake unit BU which is a hydraulic brake unit and the wheel cylinders WC. In addition, in this embodiment, the proportional solenoid valve SV is provided along the brake hydraulic circuit BC between the master cylinder MC and a branch point J. This proportional solenoid valve SV is of a normally opened type, and is closed by receiving a breaking current of a predetermined magnitude from the control unit CU. Note that when closed, the proportional solenoid valve SV interrupts the flow of brake fluid within the brake hydraulic circuit BC so as to retain brake hydraulic pressure applied to the wheel cylinders WC, whereas when opened, the proportional solenoid valve SV permits the flow of brake fluid within the brake hydraulic circuit BC.

Figure 3:
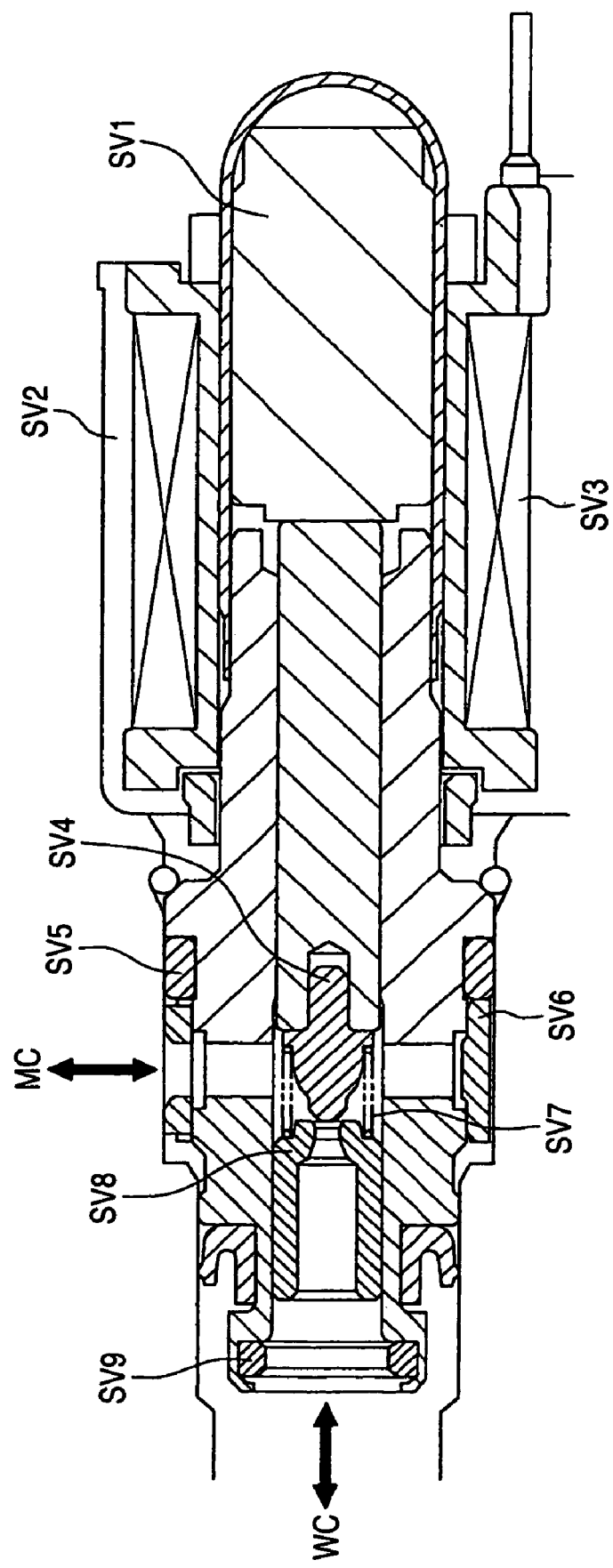
FIG. 3 is a sectional drawing of the proportional solenoid valve showing the configuration of fluid flow pathway therethrough.

FIG. 3 shows the configuration of the proportional solenoid valve SV. As shown in the figure, the proportional solenoid valve SV is configured so as to include an armature SV1, a yoke SV2, a coil SV3, a seal rod SV4, an O ring SV5, a filter SV6, a return spring SV7, a seat SV8, a filter SV9 and the like. In this proportional solenoid valve SV, an electromagnetic force generated by the coil SV3 shifts the seal rod SV4 in a direction in which the valve is closed (a direction in which the flow of brake fluid is cut off), whereas the spring force of the return spring SV7 and a differential brake hydraulic pressure between upstream and downstream brake hydraulic pressures shift the seal rod SV4 in a direction in which the valve is opened.

Namely, this proportional solenoid valve SV acts to generate a cut-off force according to the current value of breaking current supplied in such a manner that a large cut-off force is generated when the current value is large, whereas when the current value is small, a small cut-off force is generated and to retain a brake hydraulic pressure corresponding to a generated cut-off force. As a result, the proportional solenoid valve SV can retain a large brake hydraulic pressure at the wheel cylinders WC when a supplied current value is large, whereas the proportional solenoid valve SV can retain only a small brake hydraulic pressure at the wheel cylinders WC when a supplied current value is small. In addition, since, when the proportional solenoid valve SV is supplied with a breaking current with a large current value to thereby retain a large brake hydraulic pressure at the wheel cylinders WC, in the event that the current value is reduced, a cut-off force to be generated becomes small, a portion of the brake hydraulic pressure that exceeds the cut-off force so generated cannot be retained, whereby brake hydraulic pressure is reduced.

Returning to FIG. 2, while the check valve (one-way valve) CV is provided in parallel with the proportional solenoid valve SV in order to facilitate a further application of brakes, this check valve CV serves to transfer to the wheel cylinders WC a brake hydraulic pressure generated at the master cylinder MC when the driver further depresses the brake pedal BP. The check valve CV operates effectively when a brake hydraulic pressure generated at the master cylinder MC exceeds a brake hydraulic pressure retained at the wheel cylinders, and increases the brake hydraulic pressure retained at the wheel cylinders WC according to a further depression of the brake pedal BP by the driver.

Note that the brake switch BSW detects whether or not the brake pedal BP is depressed and transmits a signal carrying a result of the detection to the CVTECU 6 (the control unit CU). In addition, the brake hydraulic pressure sensor PS detects a brake hydraulic pressure on a master cylinder MC side of the proportional solenoid valve SV and transmits a signal carrying a result of the detection to the CVTECU 6 (the control unit CU). This brake hydraulic pressure sensor PS corresponds to a further application detecting sensor which detects a further application of brakes.

[Control Unit]

The control unit CU provided in the CVTECU 6 is configured so as to include various types of electric circuits and electronic circuits in addition to (not shown) CPU, memory, input/output interface, bus and the line and controls the braking force retaining unit RU.

Figure 4:
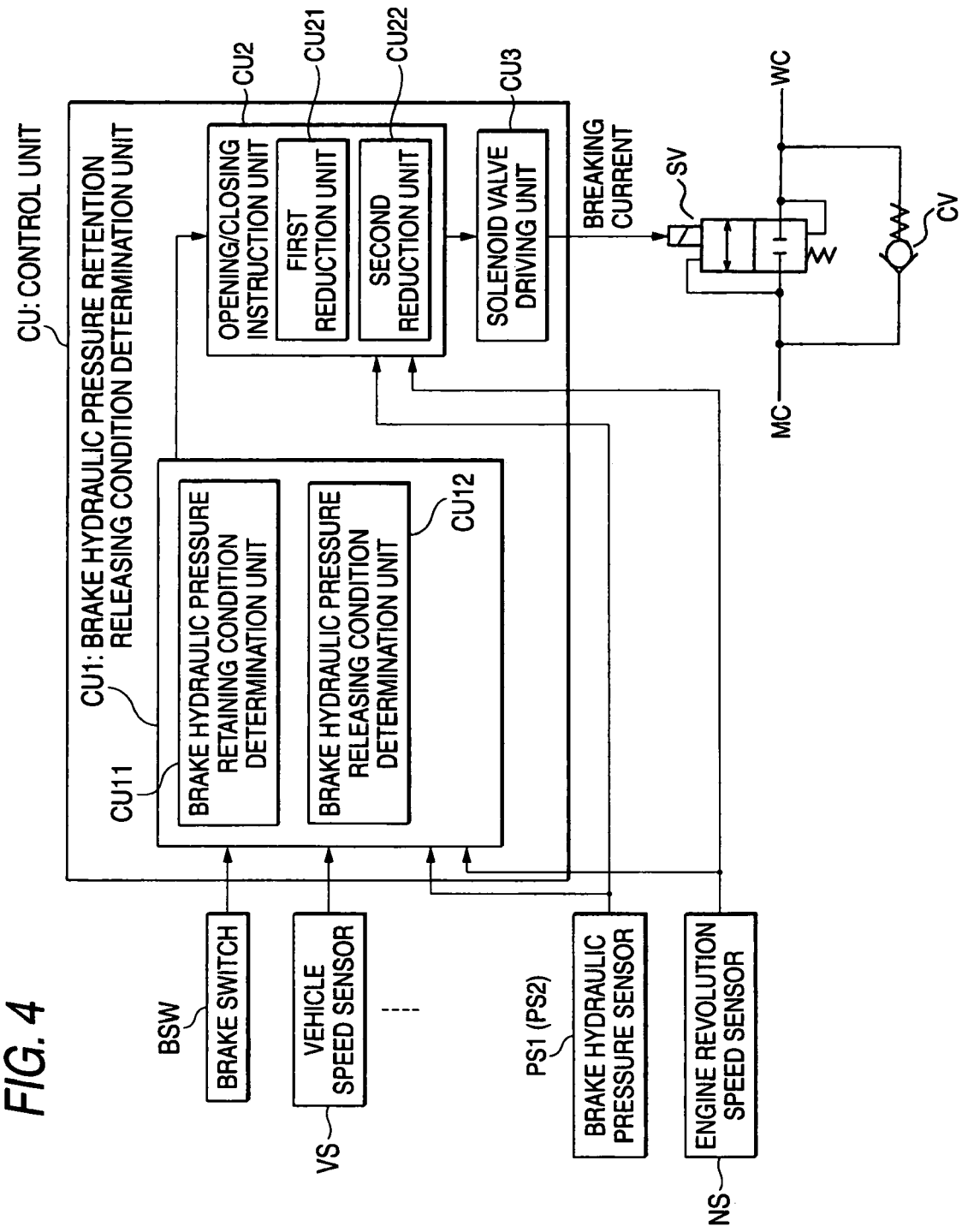
FIG. 4 is a schematic drawing of the configuration of a control unit.

FIG. 4 is a diagram showing the configuration of the control unit CU. As shown in FIG. 4, the control unit is configured so as to include a brake hydraulic pressure retention releasing condition determination unit CU1, an opening/closing instruction unit CU2 and a solenoid valve driving unit CU3.

Of these units so incorporated in the control unit CU, the brake hydraulic pressure retention releasing condition determination unit CU1 determines whether or not a condition for retaining brake hydraulic pressure (a condition for closing the proportional solenoid valve SV) is met, and whether or not a condition for releasing retained brake hydraulic pressure (a condition for opening the proportional solenoid valve SV) is met, by receiving signals inputted from the vehicle sensor VS, the brake hydraulic pressure sensors PS1, PS2, the engine rotational speed sensor NS and the like as well as a signal from the brake switch BSW. Due to this, the brake hydraulic pressure retention releasing condition determination unit CU1 incorporates therein a brake hydraulic pressure retaining condition determination unit CU11 and a brake hydraulic pressure releasing condition determination unit CU12. The respective determination units CU11, CU12 are configured so as to output signals carrying results of respective detections to the opening/closing instruction unit CU2, which is provided at a later stage. Note that the condition for retaining brake hydraulic pressure will be described later on by reference to FIG. 5. In addition, the condition for releasing brake hydraulic pressure will be described later on by reference to FIG. 6.

The opening/closing instruction unit 2 controls the proportional solenoid valve SV by receiving the results of the determinations that have been described above such as the detection result of the brake hydraulic pressure sensor PS, the detection result of the engine rotational speed sensor NS and the like. To be specific, in the event that the result of the determination indicates that the condition for retaining brake hydraulic pressure is met, the opening/closing instruction unit CU2 closes (interrupts) the proportional solenoid valve SV momentarily and thereafter reduces brake hydraulic pressure at a first reduction rate. Due to this, the opening/closing instruction unit CU2 includes a first reduction unit CU21 which (1) calculates a target current value of breaking current that is supplied to the proportional solenoid valve SV in away that is shown in an equation 1 as a function of the brake hydraulic pressure retained at the wheel cylinders WC and outputs a signal carrying the target current value so calculated to the solenoid valve driving unit CU3 at the later stage and (2) calculates a target current value in a way that is shown in an equation 2 in order that brake hydraulic pressure is reduced at the first reduction rate and outputs a signal carrying the target current value so calculated to the solenoid valve driving unit CU3 at the later stage, in the event that a result of the detection that the condition for retaining brake hydraulic pressure is met is inputted into the opening/closing instruction unit CU2.

$$I_{target}=f(\text{retained brake hydraulic pressure}) \quad \text{Equation 1}$$

$$I_{target}=I_{target}\text{-first reduction rate} \quad \text{Equation 2}$$

Here, $I_{target}$=target current value of breaking current (referred to simply as a target current value). Namely, the first reduction unit CU21 calculates by Equation 1 a target current value which corresponds to a brake hydraulic pressure that is retained at the wheel cylinders WC, and updates the target current value by reducing the same at the first reduction rate. Note that a result of the calculation by Equation 1 may be stored in a storage means so as to be read out as appropriate.

When receiving an inputted result of the determination that the condition for retaining brake hydraulic pressure is met, the opening/closing instruction unit CU2 reduces the brake hydraulic pressure that is being reduced at the first reduction rate at a second reduction rate. Due to this, the opening/closing instruction unit CU2 includes a second reduction unit CU22 which calculates a target reduction rate (the second reduction rate) of brake hydraulic pressure by the following equation 3, calculates a target current value by an equation 4 using the calculated second reduction rate and outputs a signal carrying the calculated target value to the solenoid valve driving unit CU3 at the later stage.

$$\text{Second Reduction Rate}=f\{I_{target}/(N_{end}-N_{now})\} \quad \text{Equation 3}$$

$$I_{target}=I_{target}\text{-second reduction rate} \quad \text{Equation 4}$$

Here, $N_{end}$=rotational speed (release completion rotational speed) of the engine 1 when brake hydraulic pressure is made zero, and $N_{now}$=a current value of the rotational speed of the engine 1. Namely, in the second reduction unit CU22, the rotational speed ($N_{end}$) of the engine 1 when brake hydraulic pressure is made zero is determined, and the second reduction rate is calculated every moment by Equation 3 using a difference from the current rotational speed ($N_{now}$) as a denominator. Furthermore, the target current value is updated by reducing the target current value at the second reduction rate by Equation 4. Incidentally, since in Equation 3, the denominator becomes small when $N_{now}$ (the rotational speed of the engine 1) increases largely, the gradient of the second reduction rate becomes large. Namely, the second reduction rate increases as the increase in drive force increases.

Note that the first reduction rate ensures its own existence in making adjustments necessary for smooth release when releasing brake hydraulic pressure at the second reduction rate.

The solenoid valve driving unit CU3 is electrically connected to a battery, not shown, and is configured so as to supply breaking current corresponding to the target current value to the proportional solenoid valve SV. Incidentally, the proportional solenoid valve SV of the embodiment is of a normally opened type, and the same solenoid valve SV is closed when breaking current is supplied thereto and is opened when the supply of breaking current is stopped.

[Condition for Retaining Brake Hydraulic Pressure]

Figure 5:
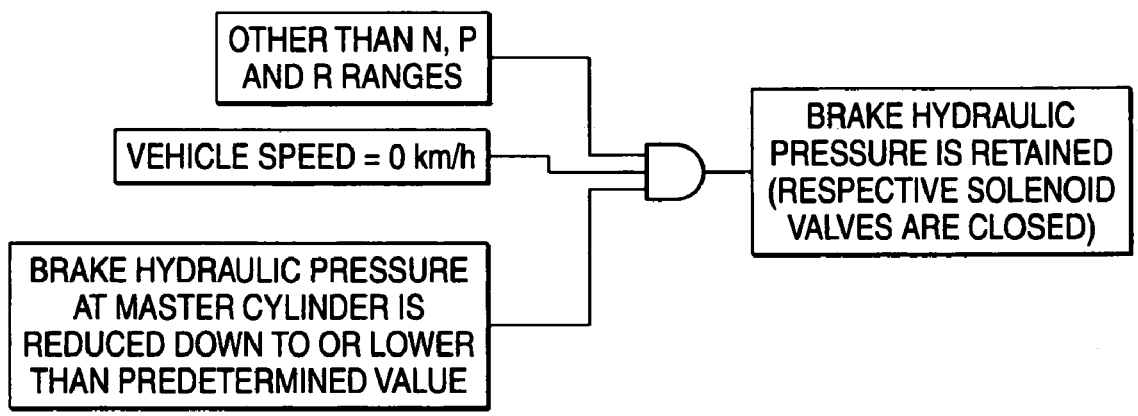
FIG. 5 is a control logic diagram showing the conditions for retaining brake hydraulic pressure (conditions for closing a solenoid valve)

FIG. 5 shows a control logic diagram which illustrates a required condition for retaining brake hydraulic pressure (a condition for closing the solenoid valve). The brake hydraulic pressure retaining condition determination unit CU11 determines whether or not the condition for retaining brake hydraulic pressure is met based on the control logic shown in FIG. 5. In this control logic, a result of the determination is obtained which indicates that the condition for retaining brake hydraulic pressure is met when (1) the gear shift position is in ranges other than N, P and R ranges, (2) the vehicle speed is equal to zero (0) km/h, and (3) the brake hydraulic pressure at the master cylinder is reduced down to or lower than a predetermined value (by releasing the depression of the brake pedal by the driver). As a result of this, the proportional solenoid valve is closed.

[Condition for Releasing Brake Hydraulic Pressure]

Figure 6:
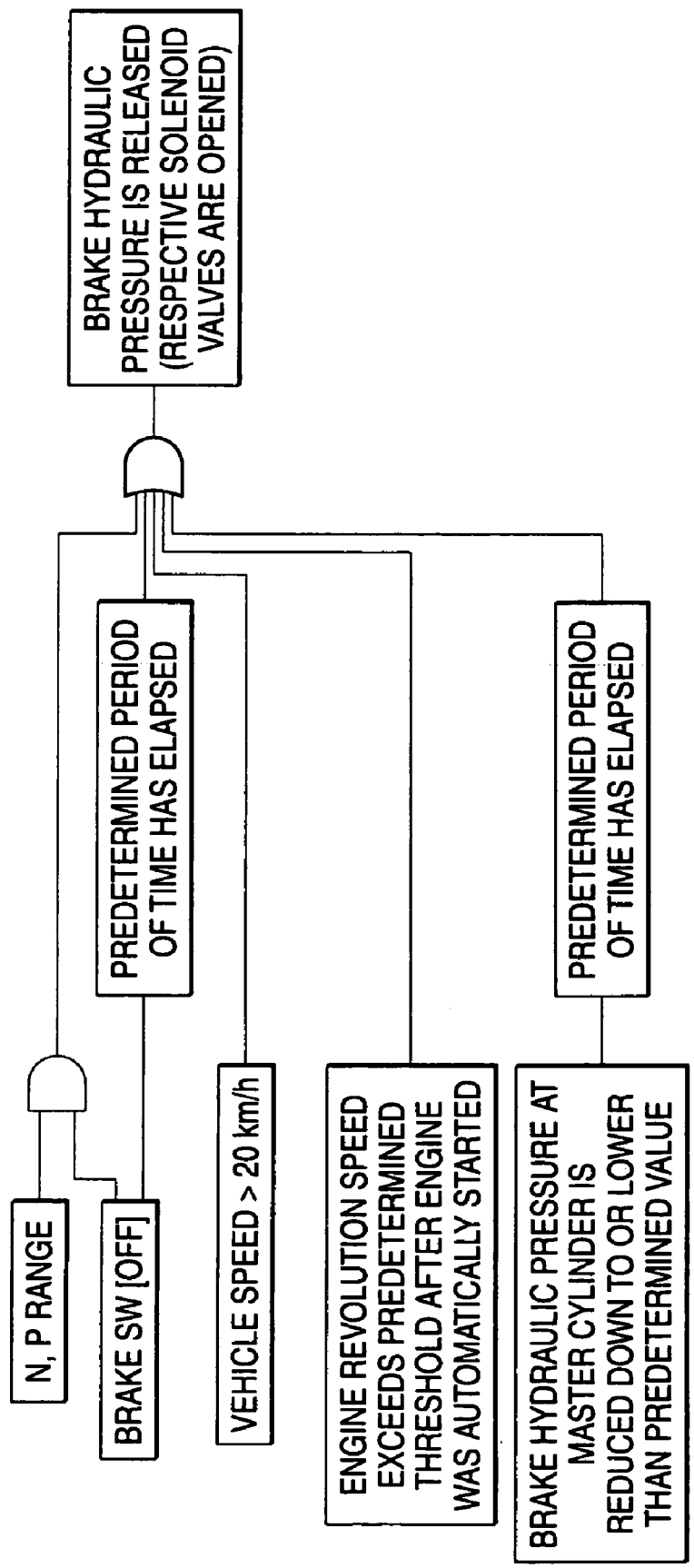
FIG. 6 is a control logic diagram showing the conditions for releasing retained brake hydraulic pressure (conditions for opening the solenoid valve)

FIG. 6 shows a control logic diagram which illustrates a condition for releasing the retained brake hydraulic pressure (a condition for opening the solenoid valve). The brake hydraulic pressure releasing condition determination unit CU12 determines whether or not the condition for releasing the retained brake hydraulic pressure is met based on this control logic. In this control logic, a result of the determination is obtained which indicates that the condition for releasing brake hydraulic pressure is met when any of the following five conditions is met: (1) the gear shift position is in the N or P range and the brake switch BSW is OFF; (2) a predetermined period of time has elapsed since the brake switch BSW was switched OFF; (3) the vehicle speed has exceeded 20 km/h; (4) the rotational speed of the engine has exceeded a predetermined threshold since the engine was automatically started; and (5) a predetermined period of time has elapsed since the brake hydraulic pressure at the master cylinder MC became equal to or lower than a predetermined value. As a result of this, the proportional solenoid valve SV is opened at the second reduction rate.

Incidentally, according to the control logic shown in FIG. 6, in case the gear shift position is in the N or P range (non-traveling range) when the driver releases the depression of the brake pedal BP, the brake hydraulic pressure retained is released momentarily. In addition, even in case the shift position is in any of the traveling ranges, when a delay time (for example, two seconds) has elapsed since the driver released the depression of the brake pedal BP, the retention of brake hydraulic pressure is released. In addition, even when the brake pedal is depressed, when the vehicle speed exceeds 20 km/h, the retention of brake hydraulic pressure is released. Incidentally, the conditions (2) and (3) are set from the viewpoint of elimination of brake dragging.

<<Operation of Braking Force Retaining Unit>>

Figure 7:
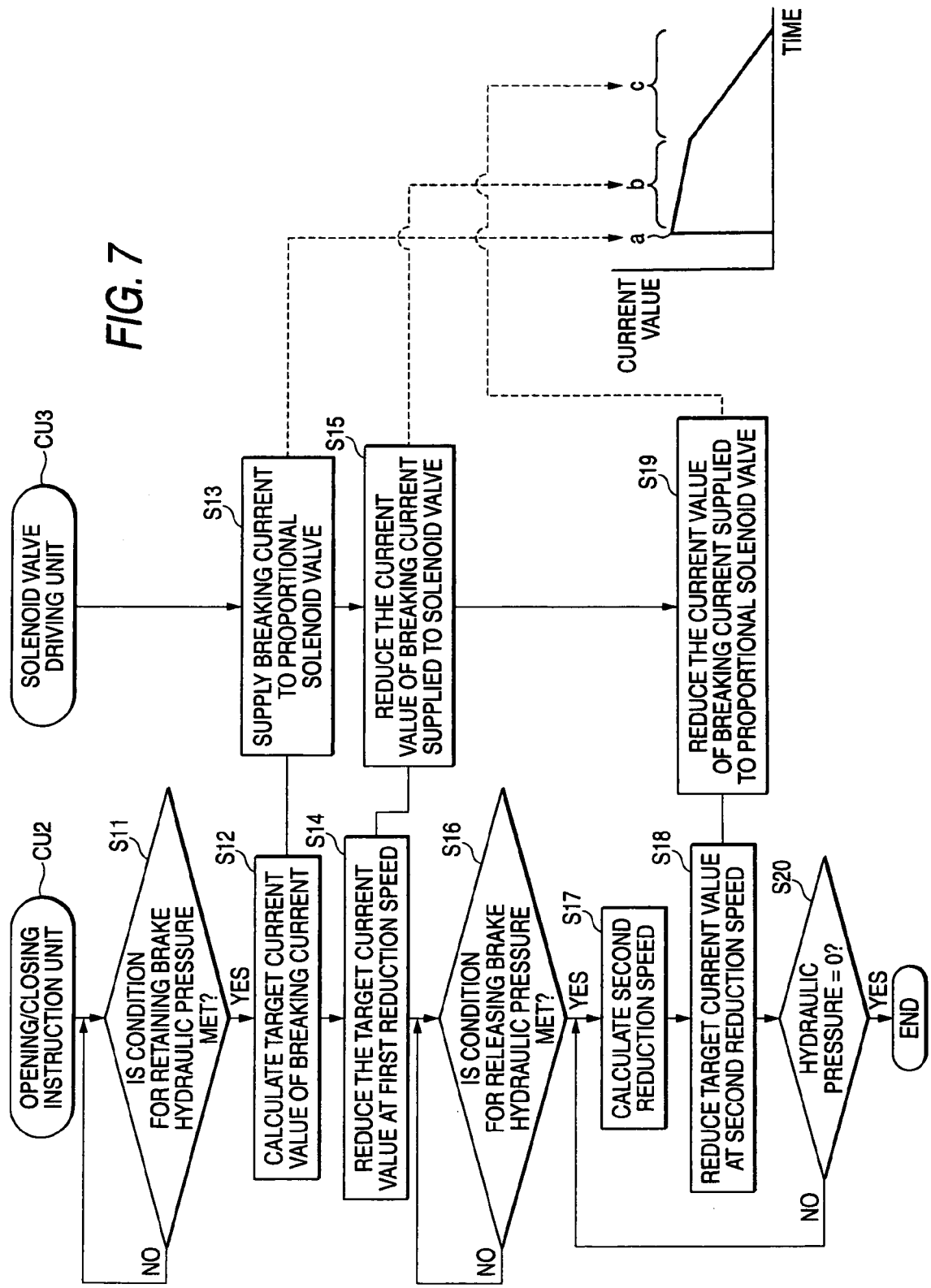
FIG. 7 is a flowchart illustrating the operation of the control unit of FIG. 2.
Figure 8:
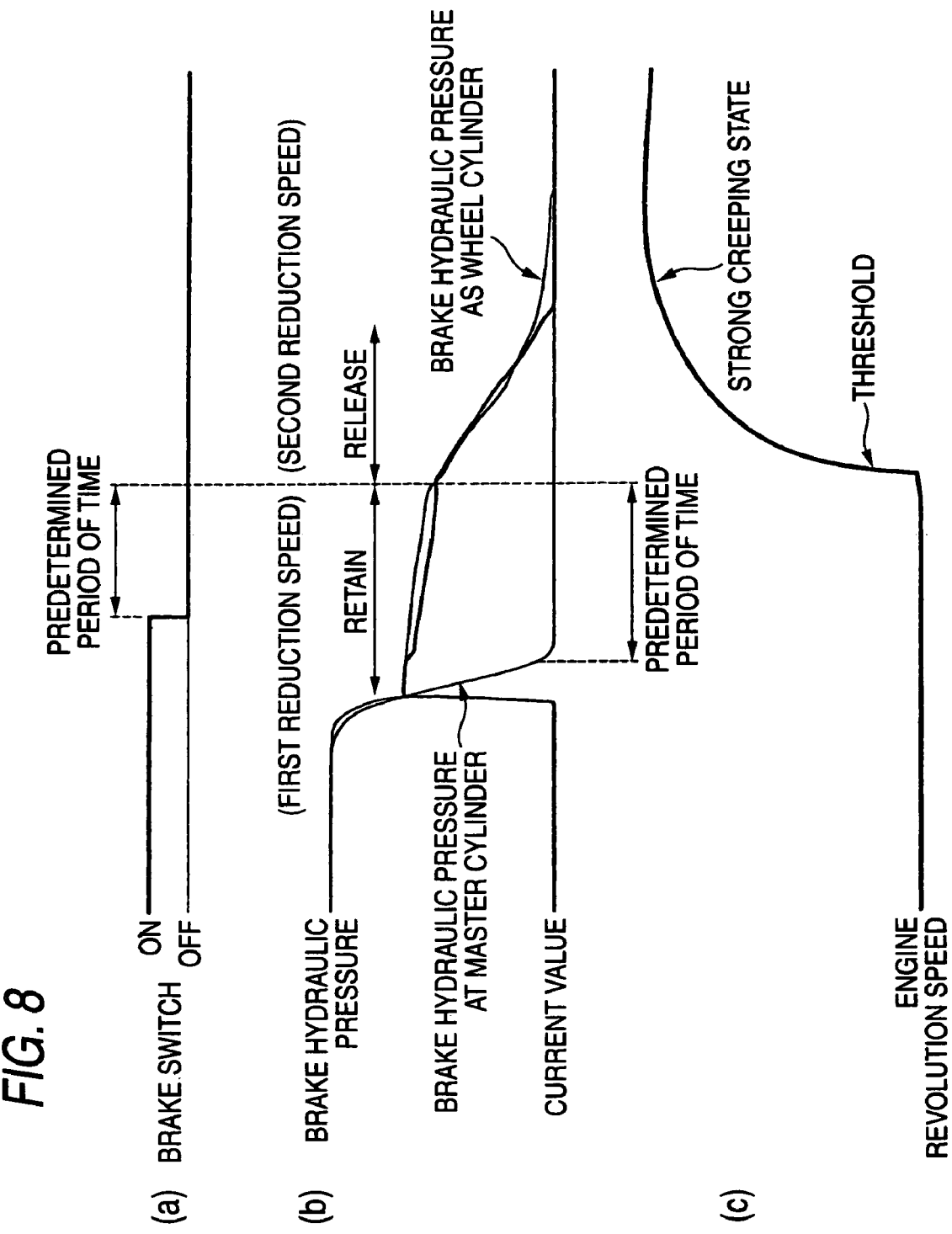
FIG. 8a is a time chart showing the operation of the braking force retaining unit in FIG. 2, which shows a change in the state of a brake switch which is switched ON and OFF.
FIG. 8(b) is a time chart showing the operation of the braking force retaining unit in FIG. 2, which shows a change in the current value of a breaking current that is supplied to the solenoid valve.
FIG. 8(c) is a time chart showing the operation of the braking force retaining unit in FIG. 2, which shows a change in the rotational speed of an engine.

The operation of the braking force retaining unit that has been described heretofore will be described by reference to a flowchart (FIG. 7) and a time chart (FIG. 8).

[Operation of Control Unit]

The operation of the control unit CU of the braking force retaining unit RU will be described by reference to a flowchart (a sequence chart) in FIG. 7 (refer to FIGS. 1 to 6 as appropriately).

The opening/closing instruction unit CU2 waits for a detection result from the brake hydraulic pressure retaining condition determination unit CU11 which indicates that the condition for retaining brake hydraulic pressure is met (S11). For example, this detection result is inputted when the brake hydraulic pressure (the detection value of the hydraulic pressure sensor PS1) at the master cylinder MC is reduced to or lower than the predetermined value (S11→Yes), and the first reduction unit CU21 calculates a target current value of the breaking current that is to be supplied to the proportional solenoid valve SV using Equation 1, which has been described above (S12). The result of the calculation is inputted into the solenoid valve driving unit CU3 which supplies a breaking current corresponding to the calculated target current value (S13). Note that while a graph at a bottom right-hand corner of FIG. 7 illustrates the current value of the breaking current that is supplied to the proportional solenoid valve SV, the current value rises momentarily as indicated by a in the graph due to step S13 being carried out. As a result of this, the proportional solenoid valve SV is closed momentarily, and the brake hydraulic pressure is retained at the wheel cylinders WC.

Following this, the first reduction unit CU21 executes a calculation, using Equation 2, to reduce the calculated target current value at the first reduction rate (S14). This calculation result is inputted into the solenoid valve driving unit CU3, where a current value of the breaking current that is to be supplied to the proportional solenoid valve SV is reduced based on the inputted calculation result (S15). After step S14, the opening/closing instruction unit CU2 waits for a determination result that the condition for releasing brake hydraulic pressure is met to be inputted from the brake hydraulic pressure releasing condition determination unit CU12 (S16). If no input (S16→No), step S14 is executed again, and the target current value is reduced further. As a result, the current value is reduced as indicated by b in the graph at the bottom right-hand side corner of FIG. 7, whereby the breaking current of the proportional solenoid valve SV is weakened, and the brake hydraulic pressure retained at the wheel cylinders WC is reduced (reduction at the first reduction rate).

In step S16, for example, a timer adapted to be activated after the brake switch BSW is OFF counts a lapse of a predetermined period of time, this determination result is inputted (S16→Yes, refer to FIG. 6), and the flow proceeds to the following step S17.

In step S17, the second reduction unit CU22 executes a calculation to obtain a second reduction rate using the equation 3 that has been described above. Furthermore, the second reduction unit CU22 executes using the equation 4 that has been described above a calculation to execute a reduction at the second reduction rate so calculated (S18). This calculation result is inputted into the solenoid valve driving unit CU3, and the current value of the breaking current that is to be supplied to the proportional solenoid valve SV is reduced based on the inputted calculation result (S19). After step S18, the opening/closing instruction unit CU2 determines whether or not the brake hydraulic pressure becomes zero (S20), and unless it becomes zero (S20→No), steps S17 and S18 are executed again. As a result, as indicated by c in the graph at the bottom right-hand side corner of FIG. 7, the current value is reduced, whereby the breaking current of the proportional solenoid valve SV is weakened, and the brake hydraulic pressure retained at the wheel cylinders WC is reduced (reduced at the second reduction rate). Then, when the brake hydraulic pressure has become zero (S20→Yes), the process is completed.

By the process that has been described above, a feeling of physical disorder and abruptness that the occupants of the vehicle feel is reduced, thereby making it possible to provide a vehicle start. Moreover, no torsional force is applied to the body of the vehicle, as happens in a case where a time difference is provided in the initiation of release of the applied brakes between the two crossed brake pipe lines. In addition, since no torsional force is applied to the body of the vehicle, a releasing time of applied graces can be set freely.

[Time Chart]

Next, the operation of the braking force retaining unit RU will be described by reference to a time chart shown in FIG. 8 (refer to FIGS. 1 to 7 as appropriate). In FIG. 8(a) a change in state of the brake switch when it is ON and OFF is shown, and FIG. 8(b) shows a change in the brake hydraulic pressure and the current value of a breaking current that is to be supplied to the solenoid valve. FIG. 8(c) shows a change in the rotational speed of the engine. Note that the brake hydraulic pressure shown in FIG. 8(b) describes both brake hydraulic pressures at the master cylinder MC and the wheel cylinders WC. In addition, FIG. 8(c) shows a situation in which the rotational speed of the engine 1 increases (a situation in which drive force increases) until the engine 1 is automatically started and the drive force becomes the strong creeping state after a predetermined time lag since the brake switch BSW was OFF.

When the depression of the brake pedal BP is released, the brake hydraulic pressure is reduced as shown in FIG. 8(b). When brake hydraulic pressure on the master cylinder MC side of the proportional solenoid valve SV is reduced down to or lower than the predetermined value, the control unit CU supplies a breaking current with the target value based on the aforesaid equation 1 to the proportional valve SV, whereby the proportional solenoid valve SV is opened. Then, the control unit CU reduces the brake hydraulic pressure retained at the wheel cylinders WC at the first reduction rate based on the aforesaid equation 2.

In addition, to describe the condition for interrupting the proportional solenoid valve SV in greater detail, the proportional solenoid valve SV is interrupted when 1) the brake hydraulic pressure on the master cylinder MC becomes equal to or smaller than a predetermined value, which is set to such a degree that the stopped state of the vehicle can be maintained, and 2) when the reduction rate of the brake hydraulic pressure on the master cylinder side MC becomes a predetermined value or greater, which is larger than the first reduction rate and is set to such a degree that the release of the brake pedal can be determined (the control unit CU is provided with a determination logic which enables the interruption of the proportional solenoid valve SV in the manner that has been described above).

Next, when any of the following three conditions is met, that is, when (1) a timer adapted to be activated after the brake switch BSW is OFF counts a predetermined period of time, (2) a timer adapted to be activated after the brake hydraulic pressure at the master cylinder MC is reduced down to or lower than a predetermined value counts a predetermined period of time, and/or (3) the rotational speed of the engine 1 exceeds a predetermined threshold after the engine 1 has been automatically started (refer to FIG. 6), then the control unit CU changes the rate of reduction of the retained brake hydraulic pressure so that, at this time, the retained hydraulic brake pressure is reduced at the second reduction rate.

Note that the second reduction rate at which the brake hydraulic pressure at the wheel cylinders WC is such as to be in accordance with (in proportion to) the rotational speed or drive force of the engine 1, as shown by the aforesaid equation 1. Namely, the retained brake hydraulic pressure (braking force) is released in accordance with the drive force. Due to this, since the braking force is reduced as if it were replaced with the increase in drive force, as has been described before, the feeling of physical disorder and abruptness that is given the occupants of the vehicle can further be reduced, thereby making it possible enable a smoother start of the vehicle from a rest state. In addition, since the second reduction rate is larger than the first reduction rate at which the brake hydraulic pressure is reduced gradually, the braking force can be released smoothly and quickly (a feeling of brake dragging can be eliminated)

<<Other Embodiments>>

The invention is not limited to the embodiment that has been described heretofore but may be embodied in various forms. For example, (refer to FIGS. 1 to 8 as appropriate) the invention may be applied to a brake unit or system of a vehicle in which an anti-lock braking system, a system which controls traction on drive wheels by virtue of braking force and a system which controls the behavior of the vehicle by virtue of braking force are installed. Since the vehicle in which such systems are incorporated includes a pump or the like which increases the brake hydraulic pressure at the wheel cylinders WC whether or not the driver depresses the brake pedal BP, the braking force may be configured so as to be increased when the drive force is reduced. Note that in a case where the brake hydraulic pressure is increased to be retained, the target current value needs to be increased. Incidentally, while in step S17 of the flowchart in FIG. 7, the second reduction rate is calculated every moment using Equation 3, this equation 3 also corresponds to the reduction in drive force (rotational speed of the engine 1), and even in the event that the drive force is reduced, a cut-off force that is made to be generated in the proportional solenoid valve SV can be made large. Namely, after brake hydraulic pressure is increased, the brake hydraulic pressure so increased can also be retained.

In addition, as to the flowchart in FIG. 7, in order that the calculation of the second reduction rate that is executed in step S17 is not repeated, the second reduction rate that is calculated first may be made to be used repeatedly in the subsequent step S18. Note that in this case, Equation 3 may be modified to the following Equation 3'. Here, $N_{th}$ is a rotational speed of the engine 1 at which the brake hydraulic pressure is started to be reduced at the second reduction rate. $I_{target}$ is a final value of the target current value which is reduced at the first reduction rate. Namely, in Equation 3', $I_{target}$, $N_{end}$ and $N_{th}$ are all fixed values.

$$\text{Second Reduction Rate} = f\{I_{target}/(N_{end}-N_{th})\} \qquad \text{Equation 3'}$$

In addition, the invention may be applied to not only vehicles with automatic transmissions but also vehicles with manual transmissions.

In addition, while the proportional solenoid valve SV is closed so as to retain the brake hydraulic pressure in the event that the condition shown in FIG. 5 is met, the condition for closing the proportional solenoid valve SV is not limited to the condition shown in FIG. 5. For example, a condition may be adopted in which the proportional solenoid valve is closed when the vehicle speed=0 km/h and the brake switch BSW is ON, that is, the brake pedal is depressed so as to stop the vehicle. It is true with respect to FIG. 6, and for example, the braking force may be made to be released by detecting an oil pressure that is supplied to the starter clutch. Namely, the increase in drive force may be expressed by the rotational speed of the engine 1 and an oil pressure value (an oil pressure instruction value) that is supplied to the starter clutch. In addition, in a so-called idle-stop vehicle in which the engine 1 is automatically started by the release of the depression of the brake pedal BP, a time that has elapsed since the brake switch BSW was OFF and a time that has elapsed since the engine 1 was automatically started may be used to express drive force. In addition, the depressing amount of the throttle pedal may be used to express drive force.

In addition, while as the cut-off valve, the solenoid valve SV adapted to be activated when an electric current is supplied thereto is described as an example, a valve may be used which is activated when hydraulic or pneumatic pressure is supplied thereto. In addition, a valve such as a diaphragm valve or a needle valve may be used in which the opening of the valve can be varied. In addition, the solenoid valve SV may be of a normally closed type.

In addition, while the drive force detecting means is used as the engine rotational speed sensor, for example, the oil pressure (oil pressure instruction value) of the starter clutch may be used as the drive force detecting means. In addition, since the drive force increases with time until the drive force falls in the strong creeping state, the drive force may be detected by the time that has elapsed since the brake switch BSW was OFF and the time that has elapsed since the engine was automatically started.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A braking force retaining unit for a hydraulic brake system in a vehicle, the hydraulic brake system comprising:
   a hydraulic brake circuit;
   a master cylinder in fluid communication with the circuit;
   at least one wheel cylinder in fluid communication with the circuit; and
   a break pedal operatively connected to the master cylinder; the brake force retaining unit comprising:
   a cut-off valve provided in the circuit disposed between the master cylinder and the at least one wheel cylinder; and
   a control unit for controlling opening and closing of the cut-off valve,
   wherein the cut-off valve retains a predetermined brake hydraulic pressure at the at least one wheel cylinder until a predetermined releasing condition is established even after the depression of the brake pedal is released when a vehicle is stopped, such that
   when the depression of the brake pedal is released, the control unit controls the cut-off valve so as to continue to retain the retained brake hydraulic pressure at the at least one wheel cylinder while gradually reducing the retained brake hydraulic pressure at a first reduction rate, and
   when the predetermined releasing condition is established, the retained brake hydraulic pressure is released such that
   the control unit controls the cut-off valve so as to gradually reduce the retained brake hydraulic pressure at the at least one wheel cylinder at a second reduction rate to thereby release the retained brake hydraulic pressure, wherein the second reduction rate is faster than the first reduction rate.

2. The braking force retaining unit as set forth in claim 1, wherein
   the cut-off valve generates a cut-off force according to a current value of a supplied breaking current in such a manner that a large cut-off force is generated when the current value is large, and a small cut-off force is generated when the current value is small, so as to retain the brake hydraulic pressure according to the generated cut-off force,
   the control unit controls the current value of the breaking current which is supplied to the cut-off valve to thereby control the cut-off valve at one of the first reduction rate and the second reduction rate, and
   the second reduction rate is a rate which is in proportion to a vehicle drive force that is detected by a drive force detecting device which detects the vehicle drive force.

3. The braking force retaining unit as set forth in claim 2, wherein the second reduction rate increases as the drive force increases.

4. The braking force retaining unit as set forth in claim 1, wherein the control unit comprises a brake releasing condition determination unit, an opening/closing instruction unit, and a cut-off valve driving unit, and wherein
   the brake releasing condition determination unit determines whether the predetermined releasing condition for releasing retained brake hydraulic pressure is met,
   the opening/closing instruction unit calculates a target current value of a breaking current, and
   the cut-off valve driving unit supplies the breaking current to the cut-off valve to thereby control the cut-off valve at one of the first reduction rate and the second reduction rate.

5. The braking force retaining unit as set forth in claim 4, wherein
   the opening/closing instruction unit calculates the target current value of the breaking current as a function of the brake hydraulic pressure retained at the at least one wheel cylinder.

6. The braking force retaining unit as set forth in claim 1, wherein
   the hydraulic brake system further comprises
   a brake switch connected to the brake pedal which is switched to ON when the brake pedal is depressed and is switch to OFF when the brake pedal is released;
   a sensor for sensing brake hydraulic pressure at the master cylinder;
   a first timer adapted to be activated when the brake switch is switched OFF; and
   a second timer adapted to be activated when a brake hydraulic pressure at the master cylinder becomes equal to or lower than a predetermined value as a result of release of the depression of the brake pedal by a driver;
   the retained brake hydraulic pressure is gradually reduced at the second reduction rate when the predetermined condition is established, wherein the predetermined condition is established when least one of the following conditions occurs:
   (1) a time period has elapsed which is set by the first timer;
   (2) the rotational speed of an engine of the vehicle exceeds a predetermined threshold; and
   (3) a time period has elapsed which is set by the second timer.

* * * * *